(12) United States Patent
Mandan et al.

(10) Patent No.: US 10,144,002 B2
(45) Date of Patent: Dec. 4, 2018

(54) MULTI-METALLIC CATALYST SYSTEM AND USE OF THE SAME IN PREPARING UPGRADED FUEL FROM BIOMASS

(71) Applicant: RELIANCE INDUSTRIES LIMITED, Mumbai (IN)

(72) Inventors: Chidambaram Mandan, Ramanathapuram (IN); Kshudiram Mantri, Purba Medinipur (IN); Ramesh Bhujade, Thane (IN); Nagesh Sharma, Vadodara (IN); Raksh Vir Jasra, Vadodara (IN)

(73) Assignee: RELIANCE INDUSTRIES LIMITED, Mumbai (IN)

( * ) Notice: Subject to any disclaimer, the term of this patent is extended or adjusted under 35 U.S.C. 154(b) by 0 days.

(21) Appl. No.: 15/135,054

(22) Filed: Apr. 21, 2016

(65) Prior Publication Data

US 2017/0021341 A1    Jan. 26, 2017

(30) Foreign Application Priority Data

Apr. 23, 2015 (IN) .......................... 1651MUM2015
Apr. 23, 2015 (IN) .......................... 1652MUM2015

(51) Int. Cl.
*B01J 23/00* (2006.01)
*B01J 27/19* (2006.01)
(Continued)

(52) U.S. Cl.
CPC ............. *B01J 27/19* (2013.01); *B01J 23/002* (2013.01); *B01J 23/882* (2013.01);
(Continued)

(58) Field of Classification Search
CPC .......... B01J 27/19; B01J 37/08; B01J 37/024; B01J 37/16; B01J 23/8877; B01J 27/0515;
(Continued)

(56) References Cited

U.S. PATENT DOCUMENTS

| | | |
|---|---|---|
| 6,531,051 B1 | 3/2003 | Kasztelan et al. |
| 2012/0055077 A1 | 3/2012 | Savage et al. |
| 2012/0094879 A1 | 4/2012 | Roberts et al. |

FOREIGN PATENT DOCUMENTS

| | | | | |
|---|---|---|---|---|
| WO | WO-2011036862 A1 | 3/2011 | | |
| WO | WO-2013103850 A1 * | 7/2013 | .......... | B01J 37/0244 |

(Continued)

OTHER PUBLICATIONS

Fereshteh Rashidi et al. "Ultradeep hydrodesulfurization of diesel fuels using highly efficient nanoalumina-supported catalysts: Impact of support, phosphorus, and/or boron on the structure and catalytic activity." Journal of Catalysis. 299 (2013) p. 321-335. Feb. 4, 2013.
(Continued)

*Primary Examiner* — Haytham Soliman
(74) *Attorney, Agent, or Firm* — Harness, Dickey & Pierce, P.L.C.

(57) ABSTRACT

The present disclosure provides a multi-metallic catalyst system comprising at least one support, and at least one promoter component and an active component comprising at least two metals uniformly dispersed on the support. The present disclosure also provides a process for preparing the multi-metallic catalyst system. Further, the present disclosure provides a process for preparing upgraded fuel from biomass. The process is carried out in two steps. In the first step, a biomass slurry is prepared and is heated in the presence of hydrogen and a multi-metallic catalyst that comprises at least one support, at least one promoter component, and an active component comprising at least two
(Continued)

2 Theta metals to obtain crude biofuel as an intermediate product. The intermediate product obtained in the first step is then cooled and filtered to obtain a filtered intermediate product. In the second step, the filtered intermediate product is hydrogenated in the presence of the multi-metallic catalyst to obtain the upgraded fuel. The fuel obtained from the process of the present disclosure is devoid of heteroatoms such as oxygen, nitrogen and sulfur.

3 Claims, 1 Drawing Sheet

(51) Int. Cl.
*B01J 37/02* (2006.01)
*B01J 37/18* (2006.01)
*B01J 37/20* (2006.01)
*B01J 37/28* (2006.01)
*B01J 23/882* (2006.01)
*B01J 23/887* (2006.01)
*B01J 27/051* (2006.01)
*B01J 35/00* (2006.01)
*B01J 35/10* (2006.01)
*C10G 3/00* (2006.01)
*B01J 37/08* (2006.01)
*B01J 37/16* (2006.01)

(52) U.S. Cl.
CPC ....... *B01J 23/8877* (2013.01); *B01J 27/0515* (2013.01); *B01J 35/002* (2013.01); *B01J 35/1019* (2013.01); *B01J 35/1038* (2013.01); *B01J 35/1042* (2013.01); *B01J 35/1061* (2013.01); *B01J 35/1085* (2013.01); *B01J 37/0203* (2013.01); *B01J 37/024* (2013.01); *B01J 37/0205* (2013.01); *B01J 37/0236* (2013.01); *B01J 37/08* (2013.01); *B01J 37/16* (2013.01); *B01J 37/18* (2013.01); *B01J 37/20* (2013.01); *B01J 37/28* (2013.01); *C10G 3/44* (2013.01); *C10G 3/46* (2013.01); *C10G 3/48* (2013.01); *C10G 3/50* (2013.01); *B01J 2523/00* (2013.01); *C10G 2300/1011* (2013.01); *C10G 2300/1014* (2013.01); *C10G 2300/202* (2013.01); *Y02P 30/20* (2015.11)

(58) Field of Classification Search
CPC .. B01J 37/0236; B01J 35/002; B01J 35/1019; B01J 35/1038; B01J 35/1042; B01J 37/20; B01J 35/1085; B01J 37/0203; B01J 37/28; B01J 37/18; B01J 37/0205; B01J 23/002; B01J 23/882; B01J 35/1061; B01J 2523/00; C10G 3/48; C10G 3/44; C10G 3/50; C10G 3/46; C10G 2300/1011; C10G 2300/202; C10G 2300/1014; Y02P 30/20
USPC .......................................................... 502/300
See application file for complete search history.

(56) References Cited

FOREIGN PATENT DOCUMENTS

| WO | WO-2013191661 A1 * | 12/2013 | .............. B01J 21/18 |
| WO | WO-2015033350 A1 | 3/2015 | |

OTHER PUBLICATIONS

Search Report regarding European Patent Application No. 16166536.9, dated Sep. 26, 2016.

* cited by examiner

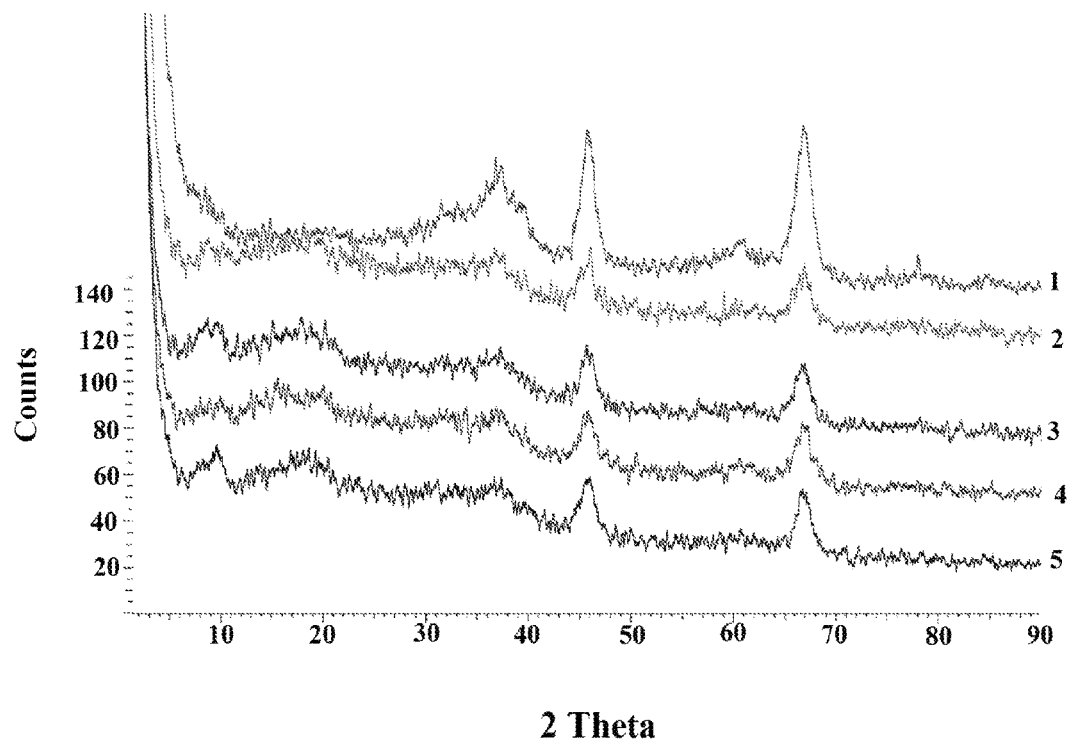

MULTI-METALLIC CATALYST SYSTEM AND USE OF THE SAME IN PREPARING UPGRADED FUEL FROM BIOMASS

CROSS-REFERENCE TO RELATED APPLICATIONS

This application claims the benefit of Indian Patent Application Nos. 1651/MUM/2015 and 1652/MUM/2015, both filed on Apr. 23, 2015. The entire disclosure of the above applications is incorporated herein by reference.

FIELD

The present disclosure relates to a multi-metallic catalyst system and use of the same in preparing upgraded fuel from biomass slurry.

DEFINITIONS

As used in the present disclosure, the following terms are generally intended to have the meaning as set forth below, except to the extent that the context in which they are used indicate otherwise.

Biomass: The term "biomass" refers to material derived from living organisms, which can be used as a source of fuel or energy.

Intermediate product: The term "intermediate product" refers to the product derived from the biomass, such as, algae, which comprises crude biofuel.

Upgraded fuel: The term "upgraded fuel" refers to the product derived from biomass, such as, algae and which can be used as an alternative to petroleum fuel.

BACKGROUND

Fossil fuels, such as coal, petroleum and natural gas, supply energy for transportation, industrial manufacturing, production of electricity, and the like. Combustion of fossil fuels generates sulfuric, carbonic, and nitric acids, which fall on the Earth as acid rain, impacting both natural areas and the environment. Further, burning of fossil fuel results in the emission of carbon dioxide, which is one of the greenhouse gases contributing to global warming. Fossil fuels are non-renewable sources of energy as they require millions of years to be formed, also the known reserves of fossil fuels are being depleted at a much faster rate than the new ones being formed. Reconciliation In the present scenario, the demand for fuels such as petrol, diesel, kerosene and the like is increasing rapidly. Fuel is generally obtained by refining crude oil. Due to the increasing demand for fuel, the reserves of crude oil are depleting. Therefore, there is a need to focus on alternative sources, like biomass, for obtaining fuel. Biomass, particularly algae, has a potential to become a viable feedstock due to its high oil content and environmentally-friendly nature. The fuel obtained by processing the biomass is termed as "biofuel". It is found that biofuels can be used as a source of energy for vehicles, and for generating electricity, etc. Conventional processes such as fermentation, extraction, gasification, pyrolysis and the like, are widely used for converting the oil contained in the biomass, particularly in algae, to biofuel. Algae are a promising source for biofuel as they have high energy content and are characterized by fast growth in the presence of carbon dioxide, water and sunlight. During photosynthesis, algae are capable of capturing carbon dioxide and sunlight and convert it into oxygen and biomass.

Various catalysts are known for conversion of biomass to biofuel. However, conventional processes using known catalysts require long extraction time, have low conversion efficiency, have limited product range, low yield, generate waste products and are energy and cost intensive.

Therefore, there is felt a need to provide a catalyst system and a process for preparing fuel from biomass that overcomes the drawbacks mentioned herein above.

OBJECTS

Some of the objects of the present disclosure, which at least one embodiment herein satisfies, are as follows:

It is an object of the present disclosure to ameliorate one or more problems of the prior art or to at least provide a useful alternative.

An object of the present disclosure is to provide a multi-metallic catalyst system.

Another object of the present disclosure is to provide a process for preparing a multi-metallic catalyst system.

Still another object of the present disclosure is to provide a process for preparing fuel from biomass.

Yet another object of the present disclosure is to provide a process for preparing fuel from algae.

Still another object of the present disclosure is to provide a simple and cost-effective process for preparing fuel from algae.

Other objects and advantages of the present disclosure will be more apparent from the following description, which is not intended to limit the scope of the present disclosure.

SUMMARY

The present disclosure relates to a multi-metallic catalyst system comprising at least one support, and at least one promoter component and an active component comprising at least two metals uniformly dispersed on the support.

The present disclosure further provides a process for preparing the afore-stated catalyst system which includes calcining at least one support, impregnating the calcined support with at least one promoter component in the presence of at least one stabilizing agent, followed by filtering, drying, and calcining to obtain a promoter component impregnated support and impregnating the promoter component impregnated support with an active component comprising at least two metal salts in the presence of the stabilizing agent, followed by filtering, drying, calcining, and reducing to obtain the multi-metallic catalyst system. The steps of impregnating the calcined support with the promoter component and the active component can be carried out in any sequence.

The present disclosure also provides a process for preparing upgraded fuel from a biomass. A biomass slurry is prepared by blending algae in water and the slurry is subjected to heating in the presence of an active gas, such as, hydrogen and a multi-metallic catalyst comprising at least one support, at least one promoter component and an active component comprising at least two metals to obtain an intermediate product containing crude biofuel. The intermediate product is further hydrogenated in the presence of the multi-metallic catalyst to obtain the upgraded fuel.

BRIEF DESCRIPTION OF THE ACCOMPANYING DRAWING

The catalyst system of the present disclosure will now be described with the help of the accompanying drawing, in which:

FIG. 1 illustrates the X-ray diffraction patterns of the catalysts system synthesized in experiment 1.

DETAILED DESCRIPTION

The conventional processes used for converting the lipid contained in the biomass, particularly in algae, to biofuel have several drawbacks, such as, longer extraction time, low conversion efficiency, limited product range, low yield, generation of waste products, energy and cost intensive, and the like. Therefore, in order to preclude the drawbacks associated with conventional processes, the present disclosure envisages a multi-metallic catalyst and a process for preparing the same. The present disclosure further provides a process for preparing upgraded fuel from biomass.

In accordance with one aspect, the present disclosure provides a multi-metallic catalyst system that comprises: at least one support, at least one promoter component impregnated on the at least one support and an active component comprising at least two metals being uniformly dispersed on the at least one support. The afore-stated components in the catalyst system are present in pre-determined quantities and proportions with respect to each other.

The at least one support of the present disclosure is selected from the group consisting of alumina, silica, zirconia, alumina-silica, zeolite, and molecular sieves. In one embodiment, the support of the present disclosure is a carrier. Further, the support is in at least one form selected from the group of extrudates, spheres, granules, and pellets. In another embodiment, the support is calcined.

In accordance with one embodiment of the present disclosure, the at least one support is alumina.

The promoter component of the present disclosure is at least one metal selected from the group consisting of Group IIIA metals, Group IVA metals, Group VA metals and Group VB metals. The promoter component typically performs the function of enhancing the overall activity of the catalyst.

In accordance with the present disclosure, the promoter component is selected from the group consisting of Niobium (Nb), Phosphorous (P), Boron (B), Gallium (Ga), Germanium (Ge), Indium (In), Aurum (Au), and Tantalum (Ta).

In accordance with the present disclosure, the amount of the promoter component is in the range of 0.1 to 1 wt % of the catalyst system.

The active component comprises at least two metals. The metal of the present disclosure is selected from the group consisting of Group IB, Group IIB, Group IVB, Group VB, Group VIB metals, Group VIIB metals, Group VIII metals and noble metals.

In accordance with the present disclosure, the metal is selected from the group consisting of Nickel (Ni), Molybdenum (Mo), Cobalt (Co), Copper (Cu), Silver (Ag), Zinc (Zn), Zirconium (Zr), Vanadium (V), Tungsten (W), Rhenium (Re), Platinum (Pt), Palladium (Pd), Ruthenium (Ru), and Rhodium (Rh).

In accordance with the present disclosure, the amount of the active component is in the range of 0.05 to 8 wt % of the catalyst system.

In one embodiment, the multi-metallic catalyst system is in the reduced form. In another embodiment, the multi-metallic catalyst system is in the sulfided form.

In accordance with an exemplary embodiment, the multi-metallic catalyst system of the present disclosure consists of phosphorus as a part of the promoter component, cobalt and molybdenum as a part of the active component impregnated on an alumina support.

In accordance with another exemplary embodiment, the multi-metallic catalyst system of the present disclosure consists of niobium as a part of the promoter component, cobalt and molybdenum as a part of the active component on an alumina support.

In accordance with still another exemplary embodiment, the multi-metallic catalyst system of the present disclosure consists of boron as a part of the promoter component, cobalt and molybdenum as a part of the active component on an alumina support.

In accordance with another aspect, the present disclosure provides a process for the preparation of a multi-metallic catalyst system. The process includes the steps presented herein below.

Initially, at least one support suitable for preparing a multi-metallic catalytic system is calcined to obtain a calcined support. In one embodiment, the support is in an amorphous state prior to further processing. Typically, the support used in the present process is selected from the group that consists of alumina, silica, zirconia, alumina-silica, zeolite, and molecular sieves.

The calcined support is then impregnated, in a pre-determined quantity, with at least one promoter component in the presence of at least one stabilizing agent. The promoter component is at least one selected from the group consists of Group IIIA metals, Group IVA metals, Group VA metals and Group VB metals. In accordance with an embodiment of the present disclosure, the source of promoter component can be phosphoric acid.

The step of impregnation is followed by filtration and then by drying, the latter step being carried out at a pre-determined temperature for a pre-determined time period. In accordance with one embodiment, the pre-determined temperature is 120° C. and the pre-determined time period ranges from 6 to 10 hours.

After drying, the promoter loaded support is calcined at a temperature in the range of 500 to 700° C. for a time period in the range of 4 to 8 hours to obtain a promoter component impregnated support. In accordance with one embodiment, the step of calcining is carried out in the presence of air.

In one embodiment, the step of impregnation is carried out by the equilibrium method. In this method, a solution of metal compound of any of the afore-stated metals is prepared by dissolving the metal compound in water or in an organic solvent. The support is then added into the solution and allowed to stand until the system reaches equilibrium. The stabilizing agent, in one embodiment, is also a solubilizing agent, is selected from the group consisting of hexamethyleneimine, ammonia solution, piperidine, pyrrolidine, morpholine, piperazine hydrate, 2-methylcyclohexyl amine, and cyclohexylamine.

Into the promoter component impregnated support, an active component comprising at least two metal salts are charged or impregnated, in pre-determined quantities, in the presence of at least one stabilizing agent. The metal salt of the present disclosure comprises a cation selected from the group of Group IB, Group IIB, Group IVB, Group VB, Group VIB metals, Group VIIB metals, Group VIII metals and noble metals and an anion selected from the group of chloride, bromide, fluoride, iodide, sulfate, phosphate, phosphonate, nitrate, nitrite, carbonate, acetate, bicarbonate, hydroxide, and oxide. The stabilizing agent used in the present step of charging may be the same or different as that used in the earlier step. The step of charging or impregnation, in one embodiment, is carried out by the equilibrium method. The resulting calcined support impregnated with a promoter component and an active component is further filtered, dried, calcined at a temperature in the range of 500 to 700° C., and reduced to obtain the multi-metallic catalyst system of the present disclosure.

The step of reduction is carried out using hydrogen at a rate of 25 mL/minute, and at a temperature in the range of 400 to 600° C. for a time period in the range of 2 to 6 hours.

The at least one support is sequentially impregnated with the promoter component and the active component. Each impregnation step is followed by drying and calcining the impregnated support. This particular feature, enables the promoter component and the active component to form a single layer of metals on the support.

The steps of impregnating the calcined support with the promoter component and the active component can be carried out in any sequence.

In accordance with the present disclosure, the term "can be carried out in any sequence" means that the calcined support can be first impregnated with the promoter component, followed by impregnation with the active component to obtain the multi-metallic catalyst as described herein-above or the calcined support can be first impregnated with the active component, followed by impregnation with the promoter component to obtain the multi-metallic catalyst.

The process for preparing the multi-metallic catalyst by first impregnating the calcined support with the active component followed by impregnation with the promoter component is described hereinafter.

Initially, at least one support selected from the group consisting of alumina, silica, zirconia, alumina-silica, zeolite, and molecular sieves is calcined to obtain a calcined support.

The calcined support is impregnated with an active component comprising at least two metals, in the presence of at least one stabilizing agent, followed by filtering, drying, and calcining, to obtain an active component impregnated support.

The active component impregnated support is further impregnated with the promoter component in the presence of at least one stabilizing agent, followed by filtering, drying and calcining to obtain a calcined support impregnated with an active component and a promoter component.

Finally, the calcined support impregnated with an active component and a promoter component is reduced to obtain the multi-metallic catalyst system.

The multi-metallic catalyst system, thus obtained, is used either in a reduced form or in a sulfided form, using at least one sulfiding agent selected from the group consisting of dimethyl disulfide and dimethyl sulfoxide.

In accordance with one embodiment of the present disclosure, the step of sulfidation is carried out using dimethyl disulfide at 371° C.

The multi-metallic catalyst system, described herein above, has applications in multifarious fields such as petrochemicals, polymers, metallurgy, and the like; making the subject matter of the present disclosure highly industrially applicable. Furthermore, the spent catalyst system of the present disclosure is capable of being regenerated; thereby increasing the economy of the process in which it is used. The multi-metallic catalyst system may be regenerated by at least one process selected from the group that includes, but is not limited to, filtration, washing, calcination and reduction. In one embodiment, the multi-metallic catalyst system can be recycled and reused at least 5 times without any loss in its catalytic activity. Still further, the multi-metallic catalyst system of the present disclosure is a highly stable system which can be used both in the presence and in the absence of a solvent.

In accordance with still another aspect of the present disclosure, there is provided a process for preparing upgraded fuel from a biomass.

In accordance with one embodiment of the present disclosure, the biomass is algae. The algae are selected from the group consisting of *Nannochloris, Spirulina* and *Nannochloropsis*.

The carbon content in the biomass is in the range of 40% to 60%. The carbon content in the biofuel and the yield of the biofuel is increased by the process of the present disclosure described herein-below, as compared the biofuel obtained by the conventional catalysts.

Initially, a biomass slurry is prepared by blending algae in water. The biomass slurry comprising algae and water is subjected to heating in the presence of an active gas and a multi-metallic catalyst to break down the bio-macromolecules in the biomass slurry and obtain an intermediate product comprising crude biofuel. Typically, the active gas can be hydrogen.

The intermediate product is then collected, cooled and filtered to obtain a filtered intermediate product.

The crude biofuel comprises long aliphatic hydrocarbons with impurities in the form of heteroatoms.

The heteroatoms in the crude biofuel include oxygen, nitrogen and sulfur.

Due to the presence of heteroatoms, the carbon content in the crude biofuel ranges from 74% to 78% and the yield of the crude biofuel ranges from 50% to 80%.

In order to increase the carbon content, there is a need to remove the heteroatoms present in the crude biofuel. Therefore, the filtered intermediate product comprising crude biofuel is subjected to hydrogenation in the presence of the multi-metallic catalyst to obtain the upgraded fuel.

In accordance with the present disclosure, the upgraded fuel obtained from the process described herein-above is substantially devoid of heteroatoms.

The carbon content in the upgraded fuel ranges from 82% to 84% and the yield of the upgraded fuel ranges from 81% to 90%.

Due to the removal of heteroatoms, the carbon content in the upgraded fuel and the yield of the upgraded fuel, comparatively increases as compared to the carbon content in the crude biofuel and the yield of the crude biofuel.

In accordance with the present disclosure, the upgraded fuel obtained by the process of the present disclosure is equivalent to the petroleum crude oil, which needs to be processed in refineries to get products such as petrol, diesel, kerosene, and the like.

The process of the present disclosure is carried out in the presence of the multi-metallic catalyst that comprises at least one support, at least one promoter component, and an active component comprising at least two metals.

In accordance with one embodiment of the present disclosure, the support is at least one selected from the group consisting of alumina, silica, zirconia, alumina-silica, zeolite and molecular sieves.

The promoter component is at least one metal selected from the group consisting of Group IIIA metals, Group IVA metals, Group VA metals and Group VB metals.

The active component is at least two metals selected from the group consisting of Group IB, Group IIB, Group IVB, Group VB, Group VIB metals, Group VIIB metals, Group VIII metals and noble metals.

In accordance with one embodiment of the present disclosure, the amount of algae in the biomass slurry ranges from 10% to 30% of the biomass slurry.

In accordance with another embodiment of the present disclosure, the algae are at least one selected from the group consisting of *Nannochloris, Spirulina* and *Nannochloropsis*. *Spirulina* is procured from Sanat Products, Uttar Pradesh, India. *Nannochloropsis* is procured from Solix Algredients, Inc., USA. *Nannochloris* is procured from Reliance Industries Limited, Gujarat, India.

In an exemplary embodiment of the present disclosure, the algae are *Nannochloris*.

In accordance with the present disclosure, the heating of the biomass slurry comprising algae and water is carried out at a temperature in the range of 200° C. to 350° C. and for a time period in the range of 15 minutes to 120 minutes.

In accordance with one embodiment of the present disclosure, the pressure of hydrogen while heating the biomass slurry is in the range of 1 MPa to 5 MPa.

In accordance with another embodiment of the present disclosure, the pressure of hydrogen while heating the biomass slurry ranges is in the range of 1 MPa to 3.5 MPa.

In accordance with the present disclosure, the filtered intermediate product is hydrogenated at a temperature in the range of 351° C. to 500° C. and for a time period in the range of 15 minutes to 120 minutes.

In accordance with one embodiment of the present disclosure, the pressure of hydrogen in hydrogenating the intermediate product is in the range of 2 MPa to 7 MPa.

In accordance with another embodiment of the present disclosure, the pressure of hydrogen in hydrogenating the intermediate product is in the range of 2 MPa to 5 MPa.

In the process step of heating the biomass slurry, water (fluid medium) is present in the biomass slurry. Hence, the process step of heating the biomass slurry is termed as "hydrothermal liquefaction". Further, the process step of hydrogenation of the intermediate product is carried out in the absence of fluid medium (water).

The process described herein-above is effective for obtaining fuel from the biomass. Further, the process of the present disclosure overcomes the drawbacks associated with conventional processes.

The present disclosure is further illustrated herein below with the help of the following experiments. The experiments used herein are intended merely to facilitate an understanding of the ways in which the embodiments herein may be practiced and to further enable those of skill in the art to practice the embodiments herein. Accordingly, the examples should not be construed as limiting the scope of embodiments herein. These laboratory scale experiments can be scaled up to industrial/commercial scale and the results obtained can be extrapolated to industrial/commercial scale.

EXPERIMENTAL DETAILS

Experiment 1: Preparation of a Multi-Metallic Catalyst System

Step I 50 g of alumina extrudate was calcined at 600° C. for 6 hours to obtain a calcined alumina.

Step II

A vessel was charged with 1.6 g Phosphoric acid in 200 mL demineralized water and 20 g hexamethyleneimine, and rotated using the rotary evaporator at 60° C. After 10 minutes, 50 g of the calcined alumina was loaded in the vessel and the rotation was continued for 2 hour to obtain a mixture. The mixture was cooled, filtered, and dried at room temperature and further dried at 120° C. overnight to obtain the dried powder. The dried powder was calcined at 600° C. for 6 hours in air to obtain a promoter component impregnated alumina.

Step III

Another vessel was charged with 52.04 g of ammonium molybdate in 300 mL of demineralized water and 20 mL of hexamethyleneimine to obtain a mixture. The mixture was stirred at a temperature of 60° C., till complete dissolution of ammonium molybdate. The mixture was cooled to 40° C. and cobalt acetate solution (4.3 g in 50 mL water) was added to it to obtain a clear purple solution. The promoter component impregnated alumina as obtained in step II was added to the clear purple solution to obtain a slurry. The slurry was rotated at 60° C. for 2 hours on rotary evaporator.

The slurry was cooled, filtered, and washed with water, dried at room temperature for 2 hours and at 120° C. overnight to obtain a solid. The solid was calcined at 600° C. for 6 hours in air and reduced at 500° C. using hydrogen at a flow rate of 25 mL/minute for 4 hours to obtain a reduced catalyst system.

Step IV

Optionally, the catalyst system obtained in Step III was sulfided as per the following procedure:

The temperature was lowered from 500° C. to 371° C. at a rate of 10° C./minute and $H_2$ pressure was maintained at 3 bar. 7.43 g of dimethyl disulfide was injected in 10-15 equal installments and temperature was lowered to 50° C. at the rate of 10° C./min to obtain the multi-metallic catalyst system.

Experiment 2: Preparation of a Multi-Metallic Catalyst System

Step-I 50 g of alumina extrudate was calcined at 600° C. for 6 hours.

Step-II

A vessel was charged with 52.04 g of ammonium molybdate and 300 mL of demineralized water and 20 mL of HMI to obtain a mixture. The mixture was stirred at a temperature of 60° C., till complete dissolution of ammonium molybdate. The mixture was cooled to 40° C. and cobalt acetate solution (4.3 g in 50 mL water) was added to it to obtain a clear purple solution. The calcined alumina as obtained in step I was added to the clear purple solution to obtain a slurry. The slurry was rotated at 60° C. for 2 hours on rotary evaporator.

The slurry was cooled, filtered and washed with water, dried at room temperature for 2 hours and at 120° C. overnight to obtain a solid. The solid was calcined at 600° C. for 6 hours in air to obtain a metal impregnated alumina ($CoMo/Al_2O_3$).

Step-III

Another vessel was charged with 1.6 g Phosphoric acid, 200 mL demineralized water and 20 g hexamethylenimine, and rotated using the rotary evaporator at 60° C. After 10 minutes, 50 g of $CoMo/Al_2O_3$ was added and the rotation was continued for 2 hour to obtain slurry. The slurry was cooled, filtered and dried at room temperature, further dried at 120° C. overnight to obtain a solid. The solid was calcined at 600° C. for 6 hours in air and reduced at 500° C. using 25 mL/min Hydrogen for 4 hours.

Step IV

Optionally, the catalyst system obtained in Step III was sulfided as per the following procedure:

The temperature was lowered from 500° C. to 371° C. at a rate of 10° C./minute and $H_2$ pressure was maintained at 3 bar. 7.43 g of dimethyl disulfide was injected in 10-15 equal installments and the temperature was lowered to 50° C. at the rate of 10° C./min to obtain the multi-metallic catalyst system.

The multi-metallic catalyst system synthesized in experiment-1 was further characterized and the properties are illustrated in Table 1, wherein 1 is CoMo/Al$_2$O$_3$ (Reference catalyst), 2 is CoMo/Al$_2$O$_3$ (without promoter), 3 is Nb—CoMo/Al$_2$O$_3$, 4 is P—CoMo/Al$_2$O$_3$ and 5 is P—CoMo/Al$_2$O$_3$ (sulphided)

Powder X-Ray Diffraction Study:

The catalyst systems of the present disclosure were subjected to X-ray diffraction and the same is presented in the FIGURE I. Except the reference catalyst (2), all the catalyst systems including CoMo/Al$_2$O$_3$ (1) and P—CoMo/Al$_2$O$_3$ (4) are crystalline in nature. Nb—CoMo/Al$_2$O$_3$ (5) and sulfided P—CoMo/Al$_2$O$_3$ (3) exhibit small humps at 2 theta values of 10 and 20, which are attributed to the promoters introduced in the catalysts.

Surface Area and Thermal Analysis:

BET surface area, pore volume, pore width, total acidity and thermal properties of CoMo/Al$_2$O$_3$ and promoter component containing catalysts are presented in Table 1. Irrespective of the metal loadings, all the catalysts exhibit similar surface area that is attributed to stability of the catalyst. The pore volume, pore width, total acidity are in a very narrow range. The surface area remains in the range of 165 to 179 m$^2$/g, pore volume 0.49 to 0.50 cc/g, and pore diameter 78 to 98 Å. The total acidity of the catalysts is in the range of 0.810 to 0.812 mmol/g except for the sulfided P—CoMo catalyst.

TGA analysis showed loss of metal and sulfided components when they were subjected to thermal decomposition.

TABLE 1

Physico-chemical properties of multi-metallic catalyst systems

| S. No. | Catalyst Name | BET surface area (m$^2$/g) | Pore volume (cc/g) | Pore width (Å) | Acidity (mmol/g) | TGA (% remained) |
|---|---|---|---|---|---|---|
| 1 | CoMo/Al$_2$O$_3$ (reference) | 176 | 0.50 | 98 | 0.842 | 91.34 |
| 2 | CoMo/Al$_2$O$_3$ | 179 | 0.49 | 97 | 0.810 | 92.58 |
| 3 | Nb—CoMo/Al$_2$O$_3$ | 170 | 0.50 | 82 | 0.812 | 96.06 |
| 4 | P—CoMo/Al$_2$O$_3$ | 165 | 0.48 | 78 | 0.811 | 93.03 |
| 5 | P—CoMo/Al$_2$O$_3$ (sulfided) | 165 | 0.49 | 81 | 0.923 | 90.13 |

It was observed that P—CoMo/Al$_2$O$_3$ (sulfided) have maximum acidity. The surface area of the catalysts present systems of the present disclosure do not vary much and it is in the range of 165 to 179 m$^2$/g.

Experiment 3: Process for Preparing Upgraded Fuel from Biomass Slurry

3A: Process for Preparing Crude Biofuel

Algal slurry in water was prepared and was loaded in a reactor. The multi-metallic catalyst of the present disclosure was added to the reactor. The reactor was then closed. Leak check was done using nitrogen at 120 bars. Nitrogen pressure was released and hydrogen gas was introduced into the reactor, till the pressure of the reactor was 3.5 MPa. The reaction mixture was heated to a temperature of 350° C. under stirring at a speed of 500 rpm. The reactor was kept at the same condition for 30 minutes after reaching the temperature of 350° C. After 30 minutes, the reactor was cooled using chilled water. After cooling, the reactor was opened and the intermediate product was collected, cooled and filtered to obtain filtered intermediate product. The crude biofuel obtained as the intermediate product was found to contain hexadecanamide with nitrogen as heteroatom. *Spirulina* was procured from Sanat Products, Uttar Pradesh, India. *Nannochloropsis* was procured from Solix Algredients, Inc., USA. *Nannochloris* was procured from Reliance Industries Limited, Gujarat, India. The algae used, the amount of algae used, the catalyst used and the amount of crude biofuel obtained is summarized in Table-2.

TABLE 2

| No. | Catalyst* | Amount of Catalyst in Slurry (g) | Algae Used | Amount of Algae in Slurry (g) | Intermediate product (Crude biofuel in %) |
|---|---|---|---|---|---|
| 1 | No Catalyst | — | *Spirulina* | 23 | 43 |
| 2 | CoMo/Al$_2$O$_3$ | 1.96 | *Spirulina* | 23 | 54 |
| 3 | CoMo/Al$_2$O$_3$ | 1.96 | *Nannochloropsis* | 23 | 68 |
| 4 | Nb—CoMo/Al$_2$O$_3$ | 1.96 | *Spirulina* | 23 | 59 |
| 5 | Nb—CoMo/Al$_2$O$_3$ | 1.96 | *Nannochloropsis* | 23 | 72 |
| 6 | Nb—CoMo/Al$_2$O$_3$ | 1.96 | *Nannochloris* | 23 | 60 |
| 7 | P—CoMo/Al$_2$O$_3$ | 1.96 | *Spirulina* | 23 | 61 |
| 8 | P—CoMo/Al$_2$O$_3$ | 1.96 | *Nannochloris* | 23 | 63 |
| 9 | B—CoMo/Al$_2$O$_3$ | 1.96 | *Spirulina* | 23 | 57 |
| 10 | B—CoMo/Al$_2$O$_3$ | 1.96 | *Nannochloris* | 23 | 65 |
| 11 | B—CoMo/Al$_2$O$_3$ | 1.96 | *Nannochloropsis* | 23 | 76 |
| 12 | Sulfided - CoMo/Al$_2$O$_3$ | 1.96 | *Nannochloris* | 23 | 53 |
| 13 | CoMo/Al$_2$O$_3$ | 1.96 | *Nannochloris* | 23 | 55 |

*The support was impregnated with promoter component, followed by the charging of the active component. Serial No. 2 and Serial No. 13 catalyst are conventional catalyst without promoter, Serial No. 3 catalyst is without promoter prepared by the process of the present disclosure, and Serial No. 4 to 12 are catalysts with promoter prepared by the process of the present disclosure.

As seen from Table-2, the yield of the crude biofuel increases when the catalysts having the promoter of the present disclosure are used. The highest yield of crude biofuel (76%) was obtained when Boron-CoMo/$Al_2O_3$ as the catalyst and *Nannochloropsis* as an algal source was used. The yield of crude biofuel from *Nannochloropsis* was 68% when catalyst without promoter was used. There is very little difference in the yield of crude biofuel, when sulfided catalyst (53%) and conventional catalyst (55%) was used.

3B: Process for Preparing Upgraded Fuel from Crude Biofuel

In order to increase the carbon content and the yield, the filtered intermediate (crude biofuel) was further hydrogenated in a reactor in the presence of the multi-metallic catalyst at 415° C. for 30 minutes to obtain upgraded fuel, which is devoid of heteroatom/s (nitrogen). During the hydrogenation of the intermediate product in the second batch reactor, a hydrogen pressure of 5 MPa was maintained in the second batch reactor. Due to the removal of nitrogen (heteroatom), an increase in the carbon content and in the yield of the upgraded fuel was observed as illustrated in Table-3. The crude biofuel obtained from *Nannochloris* was upgraded using the multi-metallic catalysts of the present disclosure. The catalyst used is summarized in Table-3.

TABLE 3

| No. | Catalyst* | Upgraded Product (%) | | | | TAN (mg KOH/g of Crude biofuel) |
|---|---|---|---|---|---|---|
| | | Upgraded fuel | Water | Residue | Gas | |
| 1 | CoMo/$Al_2O_3$ | 70.33 | 2.19 | 18.00 | 7.86 | 15.721 |
| 2 | Nb—CoMo/$Al_2O_3$ | 81.32 | 0.83 | 10.10 | 5.07 | 1.761 |
| 3 | P—CoMo/$Al_2O_3$ | 90.00 | 1.66 | 3.66 | 3.28 | 2.534 |
| 4 | B—CoMo/$Al_2O_3$ | 80.41 | 1.25 | 12.26 | 3.62 | 2.197 |
| 5 | Sulfided-CoMo/$Al_2O_3$ | 81.49 | 2.29 | 10.35 | 3.82 | 2.698 |
| 6 | Sulfided P—CoMo/$Al_2O_3$ | 84.35 | 2.03 | 9.69 | 3.37 | 1.703 |

Conditions: Crude biofuel (92%); Catalyst (10 wt %); Temperature (415° C.); agitation (500 rpm); Initial $H_2$ pressure (50 bar) and Reaction time (30 minutes). Sulfidation was done using dimethyl disulfide (DMDS).
*The support was impregnated with promoter component, followed by the charging of the active component.

It is clearly seen from Table-3 that the yield of the upgraded fuel increased when the promoter containing catalyst of the present disclosure was used. The highest yield of upgraded fuel (90.00%) was obtained when P—CoMo/$Al_2O_3$ was used as the catalyst.

Detailed chemical and physical characterization of the crude biofuel and the upgraded fuel obtained from *Nannochloris* was carried out to compare with the chemical and physical characteristics of petroleum crude oil and is summarized in Table-4.

TABLE 4

| Parameter | Unit of Measurement | Crude Biofuel | Upgraded Fuel | Petroleum Crude Oil |
|---|---|---|---|---|
| Salinity | % | 0.5 | 0.1 | — |
| pH | — | 5.2 | 6.2 | 6.7-7.5 |
| Calorific Value | Cal/g | 8501 | 9013 | 9000-12000 |
| Kin Viscosity 40° C. | cSt | 734 | 19.46 | 100-250 |
| Kin Viscosity 100° C. | cSt | 21.8 | 3 | — |
| Density at 15° C. | mg/g | 1.0468 | 0.9678 | — |
| Density at 40° C. | mg/g | 1.0283 | 0.9486 | 0.818-0.939 |
| Density at 80° C. | mg/g | 0.9972 | Boiled | — |
| API Gravity at 15° C. | — | 3.53 | 14.56 | 10-50 |
| TAN | mg KOH/g | 20.72 | 15.59 | 0.1-5 |
| Pour Point | ° C. | 3 | −25 | −50--10 |
| Freezing Point | ° C. | >−100 | >−100 | >100 |
| IBP (with DCM) | ° C. | 87.20 | 36.1 | 10-75 |
| FBP (with DCM) | ° C. | 706.10 | 644.7 | 550-750 |

The pH of crude biofuel was found to be acidic (5.2), however, the pH of the upgraded fuel (6.2) was found to be comparable to that of the petroleum crude oil (6.7 to 7.5). The calorific value of upgraded fuel (9013 Cal/g) was found to be within the range specified for petroleum crude oil (9000 Cal/g to 12000 Cal/g). The viscosity, density and the API gravity of the upgraded fuel was found to be comparable to that of the petroleum crude oil. Further, the pour point and the freezing point of upgraded biofuel were found to be similar to that of the petroleum crude oil. Initial boiling point (IBP) and final boiling point (FBP) of the upgraded biofuel was also found to be within the range of the petroleum crude oil.

Experiment 5: Process for Preparing Crude Biofuel from Biomass Slurry

The process of Experiment 4 was used, but in the catalyst used, the support was impregnated with active component, followed by the impregnating with promoter component. *Spirulina* was procured from Sanat Products, Uttar Pradesh, India. *Nannochloropsis* was procured from Solix Algredients, Inc., USA. *Nannochloris* was procured from Reliance Industries Limited, Gujarat, India. The algae used, the amount of algae used, the catalyst used and the amount of crude biofuel obtained is summarized in Table-5.

TABLE 5

| No. | Catalyst[#] | Amount of Catalyst in Slurry (g) | Algae Used | Amount of Algae in Slurry (g) | Intermediate product (Crude biofuel in %) |
|---|---|---|---|---|---|
| 1 | No Catalyst | — | Spirulina | 23 | 43 |
| 2 | CoMo/$Al_2O_3$ | 1.96 | Spirulina | 23 | 54 |
| 3 | CoMo/$Al_2O_3$ | 1.96 | Nannochloropsis | 23 | 68 |
| 4 | CoMo/$Al_2O_3$ | 1.96 | Nannochloris | 23 | 55 |
| 5 | P—CoMo/$Al_2O_3$ | 1.96 | Spirulina | 23 | 60 |
| 6 | P—CoMo/$Al_2O_3$ | 1.96 | Nannochloropsis | 23 | 75 |
| 7 | P—CoMo/$Al_2O_3$ | 1.96 | Nannochloris | 23 | 64 |

[#]The support was impregnated with the active component, followed by impregnating with the promoter component.

It is seen from Table 2 and Table 5 that the sequence of addition of the promoter component and the active component does not affect the yield of the crude biofuel. The yield of crude biofuel increases from 68% (catalyst without promoter) to 75% from *Nannochloropsis*, when P—CoMo/$Al_2O_3$ was used as the catalyst.

Technical Advancements

The present disclosure described herein above has several technical advantages including, but not limited to, the realization of:

a multi-metallic catalyst which can be recycled and regenerated;

a process for preparing crude biofuel, wherein the yield is in the range of 50% to 80%;

a process for preparing upgraded fuel which is equivalent to the petroleum crude oil and the yield of the upgraded fuel is in the range of 81% to 90%; and upgraded fuel from which the heteroatoms such as oxygen, nitrogen and sulfur are removed.

The exemplary embodiments herein quantify the benefits arising out of this disclosure and the various features and advantageous details thereof are explained with reference to the non-limiting embodiments in the description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments reveals the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein has been described in terms of preferred embodiments, those skilled in the art will recognize that the embodiments herein can be practiced with modification within the spirit and scope of the embodiments as described herein.

Any discussion of documents, acts, materials, devices, articles and the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

While considerable emphasis has been placed herein on the particular features of this disclosure, it will be appreciated that various modifications can be made, and that many changes can be made in the preferred embodiments without departing from the principles of the disclosure. These and other modifications in the nature of the disclosure or the preferred embodiments will be apparent to those skilled in the art from the disclosure herein, whereby it is to be distinctly understood that the foregoing descriptive matter is to be interpreted merely as illustrative of the disclosure and not as a limitation.

The invention claimed is:

1. A process for preparing a multi-metallic catalyst system; said process comprising the following steps:

i. calcining at least one alumina support to obtain a calcined alumina support;

ii. impregnating said calcined alumina support with, a. at least one promoter component in the presence of a stabilizing agent, followed by filtering, drying and calcining to obtain a promoter component impregnated support, wherein the promoter component is phosphorous or niobium and the stabilizing agent is hexamethyleneimine; and b. an active component comprising cobalt and molybdenum in the presence of said stabilizing agent, followed by filtering, drying, and calcining, wherein the process steps (a) and (b) are carried out in any sequence, to obtain a calcined alumina support impregnated with the promoter component at a concentration of 0.1 to 1 wt. % and the active component at a concentration of 0.05 to 8 wt. %; and iii. reducing said calcined alumina support impregnated with the promoter component and the active component to obtain the multi-metallic catalyst system.

2. The process as claimed in claim 1, further comprising sulfiding the catalyst system using at least one sulfiding agent selected from the group consisting of dimethyl disulfide and dimethyl sulfoxide.

3. The process as claimed in claim 1, wherein the calcining is carried out at a temperature in the range of 500 to 700° C.

* * * * *